(12) United States Patent
Borkowski et al.

(10) Patent No.: US 9,329,852 B2
(45) Date of Patent: May 3, 2016

(54) RISK MITIGATION FOR INSTALLATION WIZARDS

(75) Inventors: Pawel J. Borkowski, Cracow (PL);
Michal Klak, Leszno (PL);
Maksymilian Kowalik, Cracow (PL);
Bartlomiej T. Malecki, Slomniki (PL)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 13/305,468

(22) Filed: Nov. 28, 2011

(65) Prior Publication Data
US 2013/0139145 A1 May 30, 2013

(51) Int. Cl.
*G06F 9/445* (2006.01)
(52) U.S. Cl.
CPC ........................................ *G06F 8/61* (2013.01)
(58) Field of Classification Search
None
See application file for complete search history.

(56) References Cited

U.S. PATENT DOCUMENTS

| | | | |
|---|---|---|---|
| 6,237,135 B1 * | 5/2001 | Timbol | 717/107 |
| 6,560,776 B1 | 5/2003 | Breggin et al. | |
| 6,564,375 B1 | 5/2003 | Jiang | |
| 6,944,858 B2 | 9/2005 | Luu | |
| 7,185,334 B2 | 2/2007 | Bourke-Dunphy et al. | |
| 7,398,480 B2 | 7/2008 | Zimniewicz et al. | |
| 7,500,237 B1 | 3/2009 | Saiyed et al. | |
| 7,703,091 B1 | 4/2010 | Martin et al. | |
| 7,840,961 B1 | 11/2010 | Weathersby | |
| 7,975,265 B2 | 7/2011 | Schnoebelen et al. | |
| 8,191,060 B2 | 5/2012 | Malasky et al. | |
| 8,250,568 B2 | 8/2012 | Dull, III et al. | |
| 8,297,984 B2 | 10/2012 | Rogers et al. | |
| 8,380,549 B2 | 2/2013 | Haeberle et al. | |
| 2003/0028869 A1 | 2/2003 | Drake et al. | |
| 2005/0125788 A1 | 6/2005 | Lupini et al. | |
| 2008/0028392 A1 | 1/2008 | Chen et al. | |
| 2008/0102433 A1 | 5/2008 | Rogers et al. | |
| 2008/0244563 A1 | 10/2008 | Sonkin et al. | |
| 2010/0031248 A1* | 2/2010 | Sonkin et al. | 717/174 |
| 2013/0139056 A1 | 5/2013 | Borkowski et al. | |

(Continued)

OTHER PUBLICATIONS

Combined Search and Examination Report for International Application No. GB1220324.6 dated Apr. 25, 2013 6 pages.

(Continued)

*Primary Examiner* — Qamrun Nahar
(74) *Attorney, Agent, or Firm* — Stephen R. Tkacs; Stephen J. Walder, Jr.; William J. Stock

(57) ABSTRACT

A mechanism is provided in a data processing system for installing a software product in a data processing system using a debug mode of an installation wizard. The mechanism separates an installation wizard for installing a software product in a data processing system into a plurality of installation code portions. Each of the plurality of installation code portions corresponds to a state. The mechanism associates each of the plurality of installation code portions with a display panel. The mechanism initializes execution of the installation wizard. For a given installation code portion within the plurality of code portions, the mechanism presents a display panel associated with the given installation code portion to a user, receives user input associated with the given installation code portion, and proceeds to the next installation code portion. The mechanism then completes the installation wizard to install the software product in the data processing system.

20 Claims, 4 Drawing Sheets

(56) References Cited

U.S. PATENT DOCUMENTS

2013/0247006 A1    9/2013   Trowbridge
2013/0254741 A1    9/2013   Spassov et al.

OTHER PUBLICATIONS

Office Action mailed Nov. 25, 2013 for U.S. Appl. No. 13/305,402; 10 pages.

U.S. Appl. No. 13/305,402.

Wiermann, Matthias et al., "A Service and Device Monitoring Service for Smart Items Infrastructures", Proceedings of the Third International Conference on Wireless and Mobile Communications (CWMC'07), Mar. 4-9, 2007, 6 pages.

* cited by examiner

RISK MITIGATION FOR INSTALLATION WIZARDS

BACKGROUND

The present application relates generally to an improved data processing apparatus and method and more specifically to mechanisms for mitigating risk for installation wizards.

A software wizard or setup assistant is a user interface type that presents a user with a sequence of dialog boxes that lead the user through a series of well-defined steps. Tasks that are complex, infrequently performed, or unfamiliar may be easier to perform using a wizard. In contrast, an expert system guides a user through a series of questions to solve a problem.

SUMMARY

In one illustrative embodiment, a method, in a data processing system, is provided for installing a software product in a data processing system using a debug mode of an installation wizard. The method comprises separating an installation wizard for installing a software product in a data processing system into a plurality of installation code portions. Each of the plurality of installation code portions corresponds to a state. Each state may be interactive and may or may not have an associated view. The method further comprises associating each of the plurality of installation code portions with a display panel. This additional panel may replace the original view for interactive state or be presented in parallel. The method further comprises initializing execution of the installation wizard. The method further comprises, for a given installation code portion within the plurality of code portions, presenting a display panel associated with the given installation code portion to a user, receiving user input associated with the given installation code portion, and proceeding to the next installation code portion. The method further comprises completing the installation wizard to install the software product in the data processing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for risk mitigation for installation wizards. An installation wizard presents a rigid, black-box solution for software installation with little possibility to change its behavior once a product is released. Problems that occur during installation of a software product are often fatal and prevent the software product from being installed. Problems in code are inevitable. For example, because of a variety of customization variants for operating systems, including those not yet released when the installation wizard is created, a need exists for a possibility to reduce the impact of such defects from fatal to acceptable or easily solvable.

In one possible scenario, a product cannot be installed on a customer machine or a proof-of-concept installation keeps failing. It would be extremely valuable to have built-in support to quickly deal with this kind of issue without having to change the code or rebuild the installation wizard and ship it again.

In known solutions, the user can specify special flags for the installation wizard in order to skip part of the validation. Using this solution, it is possible to mitigate errors in validation. However this solution does not help when the installation wizard itself is supposed to deduce or detect values for some properties. If the defect in the installation wizard code is not limited to validation, there is no standard way to deal with the defect. Everything depends on the product being installed, the nature of the failure, and experience of the person who is trying to work around the issue.

Another known solution involves creating fake entries, modifying system files to trick the installation wizard, or even running the installation wizard on another machine and copying the destination directory to the target machine and then manually performing some steps to register the product in the system. There is no limit to the creativity required to finish an installation, that is, as long as the user is technically proficient and savvy enough to pull it off.

The illustrative embodiments provide a special mode that can be used by a user to skip any part of installation code. The mode, referred to herein as "debug mode," allows the user to inject values into installation properties manually, thus allowing the installation wizard to continue. The debug mode of the illustrative embodiments may be used by a support employee during a remote desktop session, for example.

Figure 1:
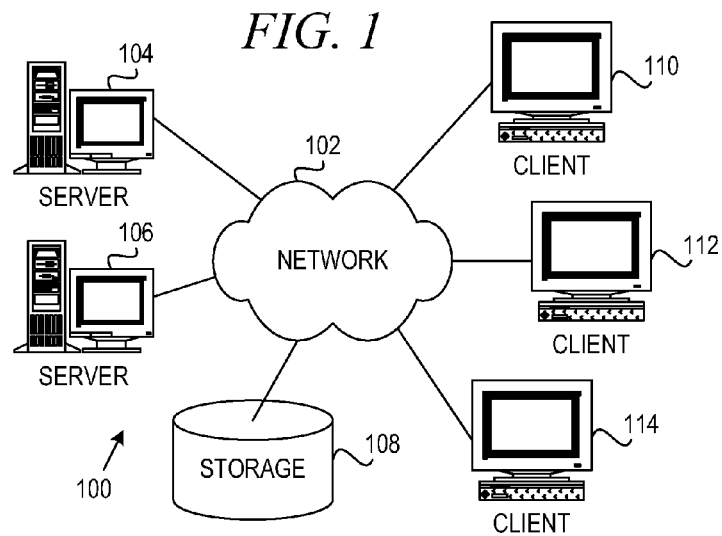
FIG. 1 depicts a pictorial representation of an example distributed data processing system in which aspects of the illustrative embodiments may be implemented.
Figure 2:
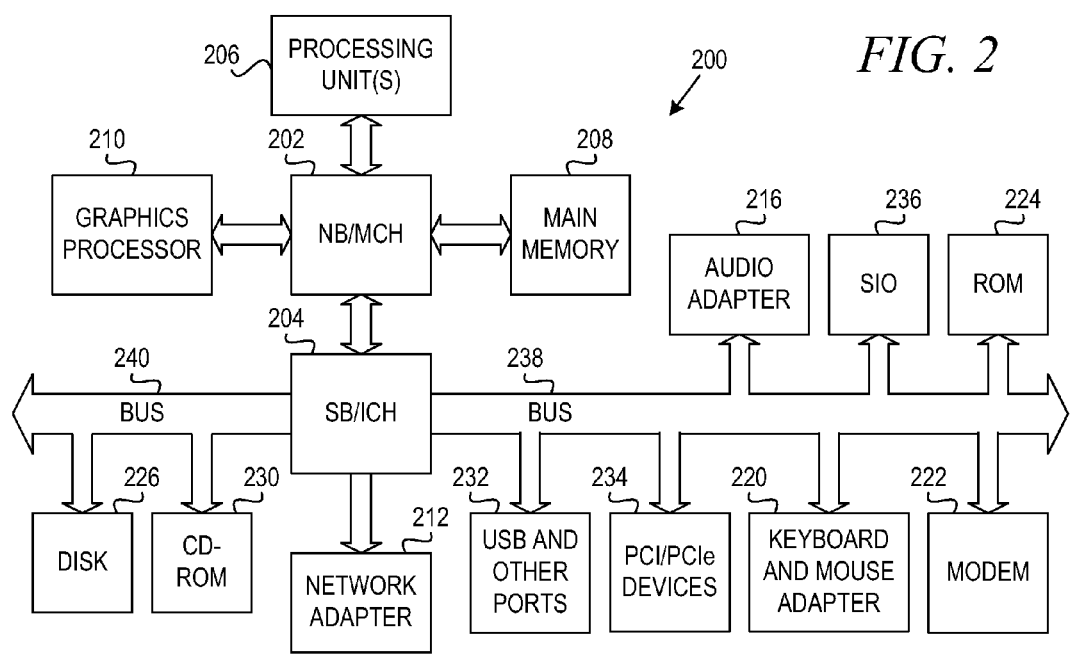
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 or server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System P® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In accordance with the illustrative embodiment, an installation wizard provides a special mode of operation referred to herein as a "debug" mode. In the debug mode, the installation wizard may pause the installation process every time a state is about to be entered. The installation wizard may pause the installation process every time a state is about to be exited. The user may skip execution of any given state. The user may view and modify all installation wizard properties. The user may view only a subset of properties related to the given state. The installation wizard may present description and acceptable values for the given state. In the debug mode, the installation process may proceed with no validation of values entered, because defects in validation may be the reason to launch the installation wizard in debug mode in the first place.

Figure 3:
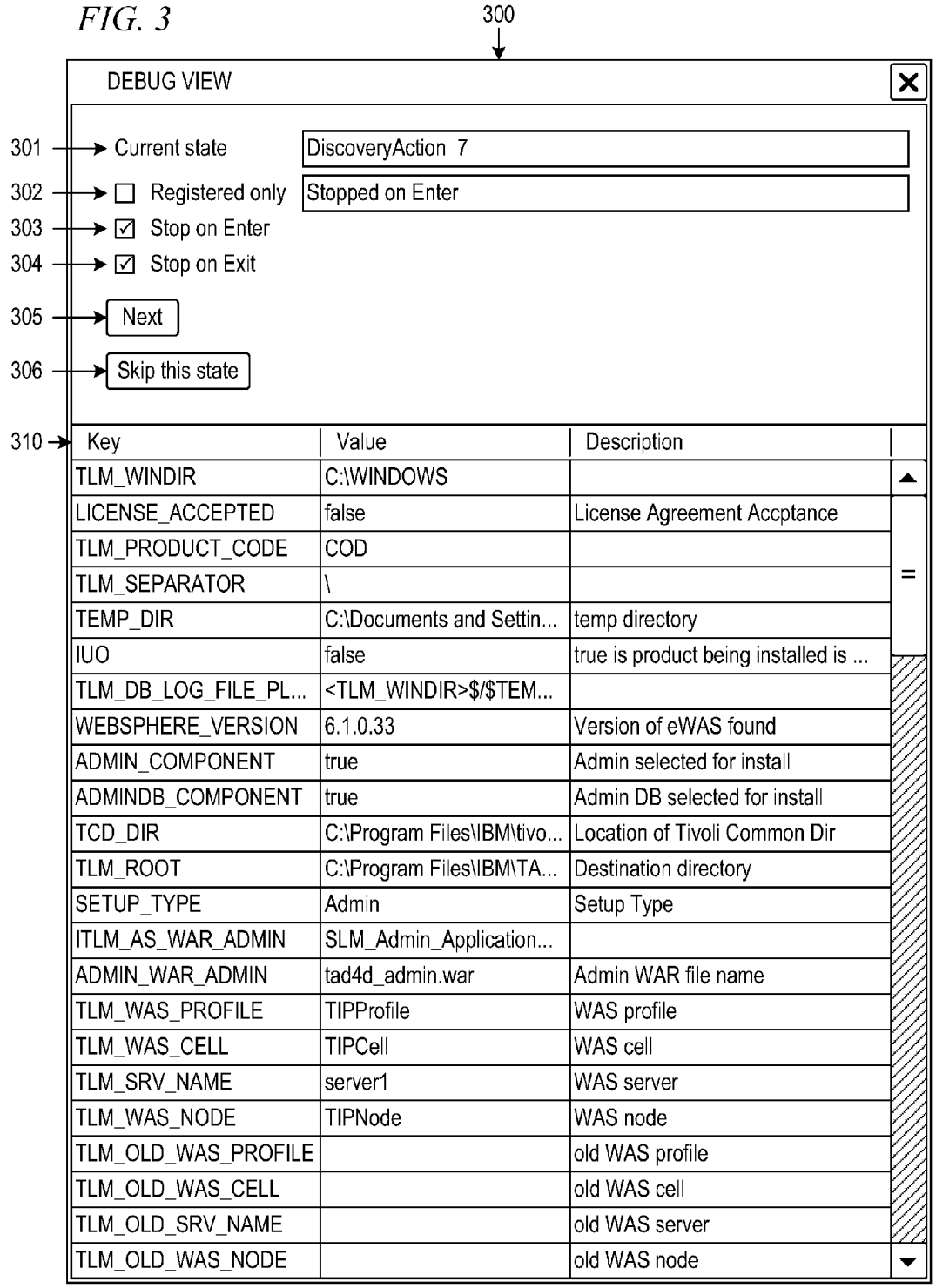
FIG. 3 depicts an example of a screen of display for a debug mode of an installation wizard in accordance with an illustrative embodiment.

FIG. 3 depicts an example of a screen of display for a debug mode of an installation wizard in accordance with an illustrative embodiment. The illustrative embodiment divides the installation process into small portions, referred to herein as "states." The illustrative embodiment represents each state with a "panel." Each state has a unique identifier. Installation wizard window 300 represents a panel in a debug view for a given state in an example installation wizard.

Installation wizard window 300 includes an information portion that presents current state 301, registered only selection control 302, stop on enter selection control 303, stop on exit selection control 304, next panel button control 305, and skip this state button control 306. Installation wizard window 300 also includes key/value portion 310, which presents key/value pairs and description information for one or more properties of the installer. All activities performed by the installer depend on the state of the installer properties, such as destination location, components selected for installation, currently installed version, etc. The list of properties for an installation process is specific to the software product being installed. In one example embodiment, key/value display portion 310 may present only those key/value pairs associated with the software being installed. In another example embodiment, key/value display portion 310 may present only those key/value pairs associated with the current state.

Current state display 301 presents the current state of the installation wizard for the given panel. A state corresponds to a portion of the installation process. Such a portion may comprise copying a file, moving a file, creating a key/value pair, changing a value in a key/value pair, etc. During the installation process, the user may wish to skip a state, perform some action before a state, and/or perform some action after the state. Every panel has a corresponding subset of properties it is entitled to modify. The installation wizard may map each state identifier (ID) to a subset of properties. For example, a "select destination" panel may modify only a "destination location" property.

If the user selects stop on enter selection control 303, the installation wizard stops the installation process before performing each portion of the installation process. If the user selects stop on exit selection control 304, the installation wizard stops the installation process after performing each portion of the installation process. The user may select stop on enter selection control 303 because the user wishes to perform some action before or in place of the portion of the installation process corresponding to the state. For example, the installation process may be known to fail because the installation wizard attempts to copy a file to a directory that does not exist. Therefore, the user may wish to stop the installation process upon entering the state to create the directory. The user may select stop on exit selection control 304 because the user wishes to perform some action after the portion of the installation process corresponding to the state. For example, the installation process may be known to fail because the installation wizard writes an incorrect value to the operating system registry. Therefore, the user may wish to stop the installation process upon exiting the state to write the correct value to the appropriate key/value pair.

The user may select next button control 305 to perform the portion of the installation process corresponding to the current state and proceed to the next state. On the other hand, the user may select skip state button control 306 to skip the portion of the installation process corresponding to the current state and proceed to the next state. For example, the installation process may be known to fail because the installation wizard writes an incorrect value to the operating system registry. Therefore, the user may wish to stop the installation process upon entering the state to write the correct value to the appropriate key/value pair and skip this portion of the installation process.

The user may select next button control 305 to perform the portion of the installation process corresponding to the current state and proceed to the next state. On the other hand, the user may select skip state button control 306 to skip the portion of the installation process corresponding to the current state and proceed to the next state. For example, the installation process may be known to fail because the installation wizard writes an incorrect value to the operating system registry. Therefore, the user may wish to stop the installation process upon entering the state to write the correct value to the appropriate key/value pair and skip this portion of the installation process.

Figure 4:
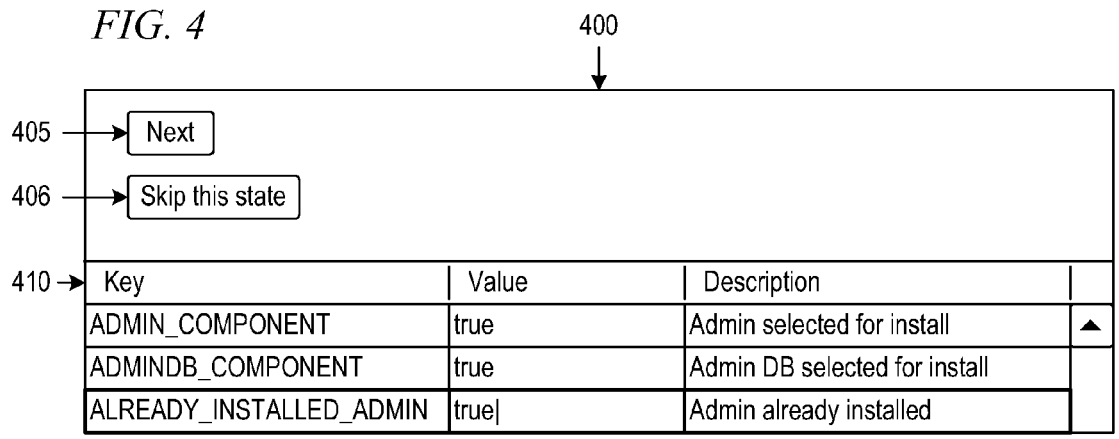
FIG. 4 depicts an example of a screen of display for a debug mode of an installation wizard in which a user can manually enter a value for a property in accordance with an illustrative embodiment.

FIG. 4 depicts an example of a screen of display for a debug mode of an installation wizard in which a user can manually enter a value for a property in accordance with an illustrative embodiment. Installation wizard window 400 includes an information portion that presents next panel button control 405, skip this state button control 406, and key/value portion 410.

The user may have selected the stop on enter selection control or the stop on exit selection control because the user wishes to perform some action before, in place of, or after the portion of the installation process corresponding to the state. In the depicted example, the portion of the installation process may attempt to discover whether an admin is installed; however, due to an error in the installation code, this step may fail. The user may insert a key/value pair into the set of properties and set the value of the property "ALREADY_INSTALLED_ADMIN" to "true" to indicate the admin is already installed. The user may then select the skip this state button control 406 such that the installation wizard proceeds to the next panel without executing the portion of code corresponding to the current state. The installation wizard proceeds, preserving all of the values entered manually by the user.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
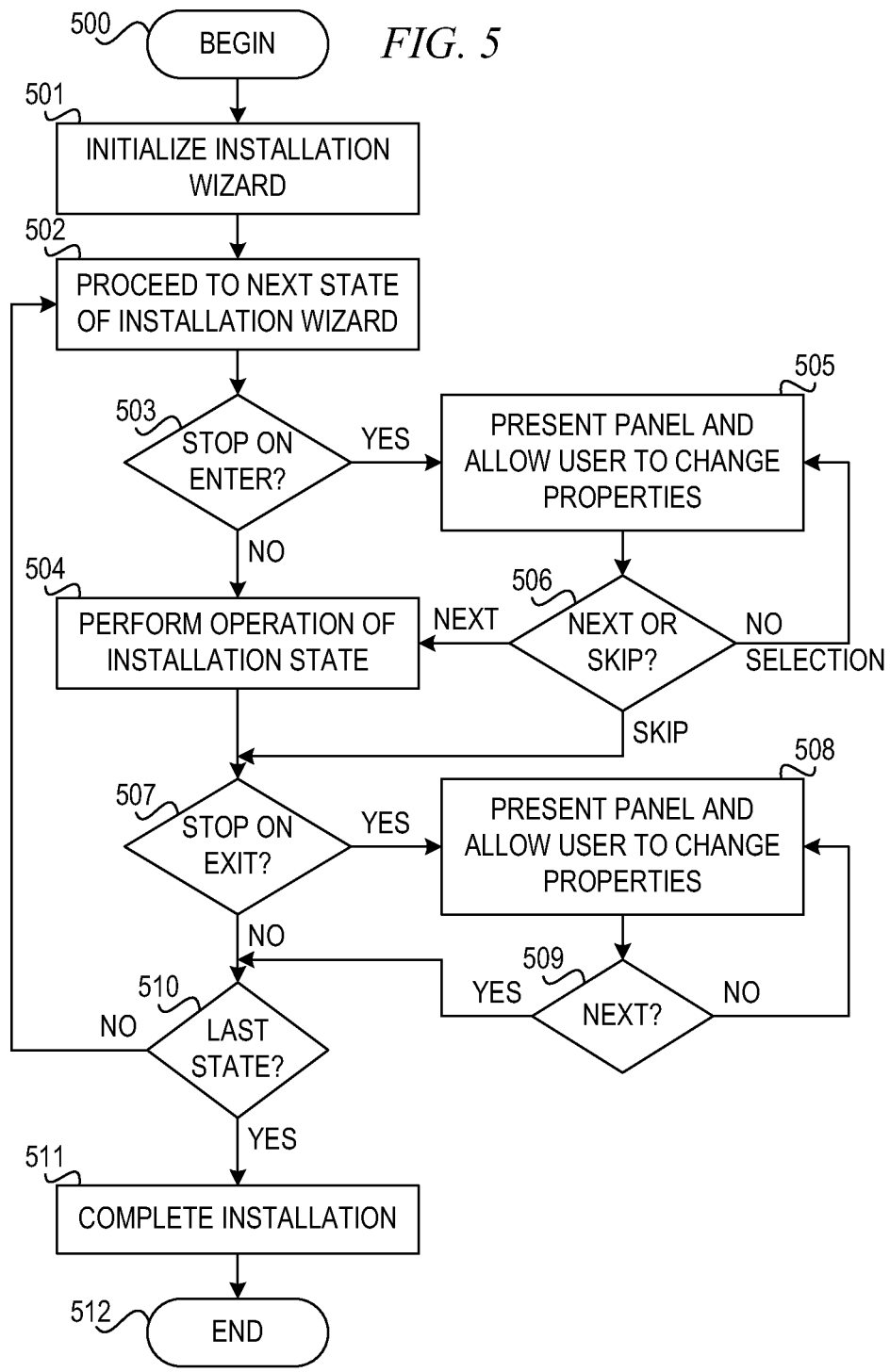
FIG. 5 is a flowchart illustrating operation of a mechanism for installing a software product in a data processing system using a debug mode of an installation wizard in accordance with an illustrative embodiment.

FIG. 5 is a flowchart illustrating operation of a mechanism for installing a software product in a data processing system using a debug mode of an installation wizard in accordance with an illustrative embodiment. Operation begins (block 500), and the mechanism initializes an installation wizard for installing the software product on the data processing system (block 501). The mechanism proceeds to the next state of the installation wizard (block 502), which at this point is the first state of the installation wizard. The mechanism determines whether the user has selected a control instructing the installation wizard to stop on entering each state (block 503). If the user does not instruct the installation wizard to stop on entering the state, the mechanism performs operation of the installation state (block 504). If the user does instruct the installation wizard to stop on entering the state in block 503, the mechanism presents a panel for the state to the user and allows the user to change properties associated with the state (block 505). Then, the mechanism determines whether the user selects a control instructing the installation wizard to continue installation to the next state (506: NEXT) or proceed to the next state without performing the operation of the current installation state (506: SKIP). If the user does not select a control instructing the installation wizard to continue to the next state or skip the current state in block 506, operation returns to block 505 to present the panel and allow the user to change properties.

If the user selects a control instructing the installation wizard to continue to the next state in block 506, operation proceeds to block 504 to perform the operation of the installation state. Thereafter, or if the user selects a control instructing the installation wizard to skip the current state in block 506, the mechanism determines whether the user has selected a control instructing the installation wizard to stop on exiting each state (block 507). If the user does instruct the installation wizard to stop on exiting the state in block 507, the mechanism presents a panel for the state to the user and allows the user to change properties associated with the state (block 508). Then, the mechanism determines whether the user selects a control instructing the installation wizard to continue installation to the next state (509). If the user does not select a control instructing the installation wizard to continue to the next state in block 509, operation returns to block 508 to present the panel and allow the user to change properties.

If the user instructs the installation wizard to continue installation to the next state in block 509, or the user does not instruct the installation wizard to stop on exiting the state in block 507, the mechanism determines whether the current state is the last state in the installation wizard (block 510). If the current state is not the last state, operation returns to block 502 to proceed to the next state of the installation wizard. If the current state is the last state in block 510, the mechanism completes installation (block 511), and operation ends in block 512.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for risk mitigation for installation wizards. The mechanisms provide a special mode that can be used by a support employee. The special mode can be used to skip any part of installation code and allow the user to manually inject or modify values for any installation properties, thus allowing the installation wizard to continue. The mechanism provide a simple and standard way to deal with installation problems and allow disabling of only small parts of installation code, leaving the rest of the installation process unchanged. Thus, the mechanisms allow the user to complete installation without having to mimic installer behavior from a first point of failure to the end.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for installing a software product in a data processing system using a debug mode of an installation wizard, the method comprising:
    separating an installation wizard for installing a software product in a data processing system into a plurality of installation code portions, wherein each of the plurality of installation code portions corresponds to a state;
    associating each of the plurality of installation code portions with a display panel;
    initializing execution of the installation wizard;
    for a given installation code portion within the plurality of code portions, presenting a display panel associated with the given installation code portion to a user, wherein each given display panel presents a description and acceptable values for at least one installation property of the given installation code portion associated with its corresponding state, receiving user input inserting or modifying a key/value pair of an installation property of the given installation code portion to ensure the given installation code portion completes without failure, and proceeding to the next installation code portion; and
    completing the installation wizard to install the software product in the data processing system using the inserted or modified installation property.

2. The method of claim 1, wherein the at least one installation property comprises a destination location, at least one component selected for installation, or a currently installed version.

3. The method of claim 1, further comprising mapping each state to a subset of installation properties corresponding to its corresponding installation code portion.

4. The method of claim 1, wherein presenting the display panel associated with the given installation code portion comprises:
    responsive to determining the user has selected a control instructing the installation wizard to stop on entering a state, presenting the display panel prior to executing the given installation code portion.

5. The method of claim 4, wherein proceeding to the next installation code portion comprises:
    responsive to determining the user has selected a next state control, executing the given installation code portion.

6. The method of claim 4, wherein proceeding to the next installation code portion comprises:
responsive to determining the user has selected a skip state control, proceeding to the next state without executing the given installation code portion.

7. The method of claim 4, wherein proceeding to the next installation code portion comprises:
responsive to determining the user has selected a control instructing the installation wizard to stop on exiting a state, presenting the display panel after executing the given installation code portion.

8. A computer program product comprising a computer readable storage medium having a computer readable program stored therein, wherein the computer readable program, when executed on a computing device, causes the computing device to:
separate an installation wizard for installing a software product in a data processing system into a plurality of installation code portions, wherein each of the plurality of installation code portions corresponds to a state;
associate each of the plurality of installation code portions with a display panel;
initialize execution of the installation wizard;
for a given installation code portion within the plurality of code portions, present a display panel associated with the given installation code portion to a user, wherein each given display panel presents a description and acceptable values for at least one installation property associated with its corresponding state, receive user input inserting or modifying a key/value pair of an installation property associated with the given installation code portion to ensure the given installation code portion completes without failure, and proceed to the next installation code portion; and
complete the installation wizard to install the software product in the data processing system using the inserted or modified installation property.

9. The computer program product of claim 8, wherein the at least one installation property comprises a destination location, at least one component selected for installation, or a currently installed version.

10. The computer program product of claim 8, wherein presenting the display panel associated with the given installation code portion comprises responsive to determining the user has selected a control instructing the installation wizard to stop on entering a state, presenting the display panel prior to executing the given installation code portion.

11. The computer program product of claim 8, wherein the computer readable program is stored in a computer readable storage medium in a data processing system and wherein the computer readable program was downloaded over a network from a remote data processing system.

12. The computer program product of claim 8, wherein the computer readable program is stored in a computer readable storage medium in a server data processing system and wherein the computer readable program is downloaded over a network to a remote data processing system for use in a computer readable storage medium with the remote system.

13. An apparatus, comprising:
a processor; and
a memory coupled to the processor, wherein the memory comprises instructions which, when executed by the processor, cause the processor to:
separate an installation wizard for installing a software product in a data processing system into a plurality of installation code portions, wherein each of the plurality of installation code portions corresponds to a state;
associate each of the plurality of installation code portions with a display panel;
initialize execution of the installation wizard;
for a given installation code portion within the plurality of code portions, present a display panel associated with the given installation code portion to a user, wherein each given display panel presents a description and acceptable values for at least one installation property associated with its corresponding state, receive user input inserting or modifying a key/value pair of an installation property associated with the given installation code portion to ensure the given installation code portion completes without failure, and proceed to the next installation code portion; and
complete the installation wizard to install the software product in the data processing system using the inserted or modified installation property.

14. The apparatus of claim 13, wherein each at least one installation property comprises a destination location, at least one component selected for installation, or a currently installed version.

15. The apparatus of claim 13, wherein presenting the display panel associated with the given installation code portion comprises:
responsive to determining the user has selected a control instructing the installation wizard to stop on entering a state, presenting the display panel prior to executing the given installation code portion.

16. The apparatus of claim 15, wherein proceeding to the next installation code portion comprises:
responsive to determining the user has selected a next state control, executing the given installation code portion.

17. The apparatus of claim 15, wherein proceeding to the next installation code portion comprises:
responsive to determining the user has selected a control instructing the installation wizard to stop on exiting a state, presenting the display panel after executing the given installation code portion.

18. The computer program product of claim 8, wherein the computer readable program further causes the computing device to:
map each state to a subset of installation properties corresponding to its corresponding installation code portion.

19. The computer program product of claim 10, wherein proceeding to the next installation code portion comprises:
responsive to determining the user has selected a next state control, executing the given installation code portion.

20. The apparatus of claim 15, wherein the instructions further cause the processor to:
map each state to a subset of installation properties corresponding to its corresponding installation code portion.

* * * * *